Figure 1:
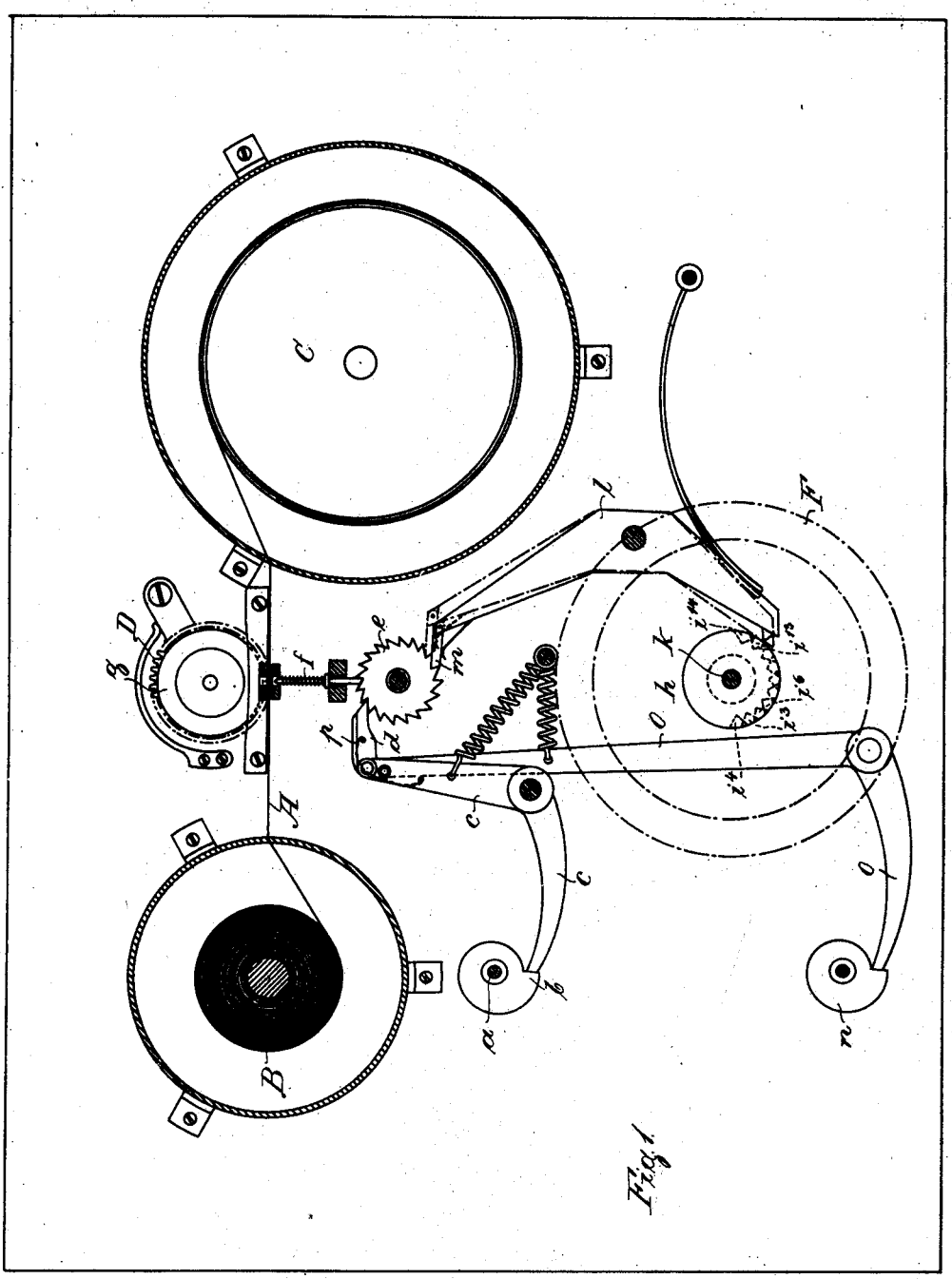

No. 667,762. Patented Feb. 12, 1901.
A. BOPP.
SPEED RECORDER AND COURSE INDICATOR FOR SHIPS.
(Application filed Sept. 2, 1899.)
(No Model.) 2 Sheets—Sheet 1.

Witnesses:
Carl Ruff.
Arthur Scholz.

Inventor.
Adolf Bopp.
by Robert Reipler
Attorney.

No. 667,762. Patented Feb. 12, 1901.
A. BOPP.
SPEED RECORDER AND COURSE INDICATOR FOR SHIPS.
(Application filed Sept. 2, 1899.)
(No Model.) 2 Sheets—Sheet 2.
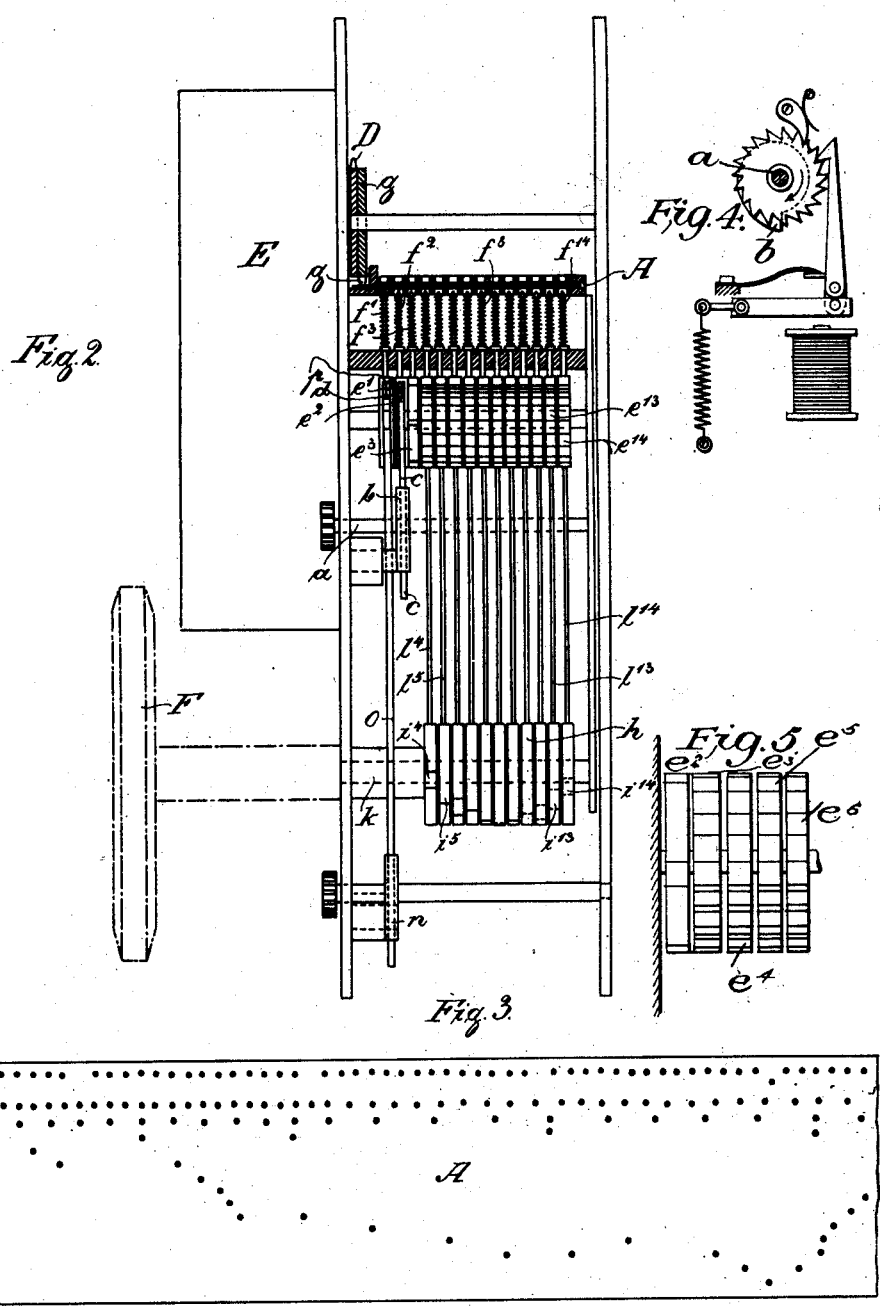
Witnesses:
Inventor.
Adolf Bopp.

ously the punch $d^2$ has punched a hole

UNITED STATES PATENT OFFICE.

ADOLF BOPP, OF BERLIN, GERMANY.

SPEED-RECORDER AND COURSE-INDICATOR FOR SHIPS.

SPECIFICATION forming part of Letters Patent No. 667,762, dated February 12, 1901.

Application filed September 2, 1899. Serial No. 729,320. (No model.)

*To all whom it may concern:*

Be it known that I, ADOLF BOPP, a subject of the King of Prussia, German Emperor, and a resident of Berlin, in the Kingdom of Prussia, German Empire, have invented a certain new and useful Speed-Recorder and Course-Indicator for Ships, of which the following is an exact specification.

The invention relates to a ship's recorder by means of which the movements of the rudder as well as the speed of the vessel and the number of revolutions of the engine automatically are recorded. My improved recorder indicating upon the same tape the time in minutes and seconds, the mariner is enabled by reason of the indications to know at any time the approximate situation of the vessel, the position of the rudder, the speed of the vessel, and the number of turns of the engine, whereby he is enabled to judge of the capacity of run of the vessel at certain positions of the rudder and with a certain speed of the engine.

I am aware of the existence of ships' logs recording the speed of the ship and of registering apparatus indicating the direction of the vessel; but no apparatus has as yet been constructed by means of which the speed of a vessel, the direction of the same, and the time at which the ship had the speed in question or the indicated direction could be known. Hitherto the speed of vessels was recorded by the ship's log, while for registering the time especial time-indicators were employed. The knowledge of the direction of a vessel alone is useless for the mariner. What he wants to know is the speed of the ship at a certain time when the rudder was in a certain position and when the engine worked with a certain speed.

The purpose of my invention is to provide an apparatus recording the speed of the vessel, the deviations of the rudder, the number of turns of the engine, and the corresponding time.

To these ends my invention consists of certain features of construction and combinations of parts, which will be hereinafter fully described and claimed.

Reference is to be had to the accompanying drawings, forming a part of the specification, in which similar letters of reference indicate corresponding parts in all the views.

Figure 1 is a side elevation of my apparatus. Fig. 2 illustrates a transverse section through the same. Fig. 3 represents a part of the tape, preferably of paper, illustrating the indications of time, engine-revolutions, speed, &c. Fig. 4 illustrates a detail view from which it can be seen in what manner the shaft $a$ is rotated. Fig. 5 is a detail view of the toothed wheels $e^2$, &c.

The apparatus for registering the speed is actuated by the ship's log usually employed and attached to a vessel in the usual manner. This log during a certain distance effects a determined number of revolutions, whereby it actuates a gearing which at predetermined intervals closes an electric current. The current is connected to an electromagnetic gear. This mechanism is illustrated as an example in Fig. 4 of the drawings and is known to everybody skilled in the art of navigation. The aforementioned gears impart motion to a shaft $a$, carrying a cam $b$, which at each revolution rocks the crank-lever $c$, spring-pressed by spiral springs. The free extremity of the crank-lever $c$ is provided with a pawl $d$, which at each movement of the angle-lever $c$ moves the ratchet-wheel $e$ one tooth. This ratchet-wheel $e$, as illustrated in Fig. 2 of the drawings, is composed of two toothed disks $e^2$ $e^3$, rigidly connected to another. The number of teeth of both disks is a different one. Advantageously the number of the one is a multiple of the other. Each of these toothed wheels $e^2$ $e^3$ acts upon prickers or punches $d^2$ $d^3$, constantly held down by means of spiral springs in such manner that during the movement of the corresponding disks each tooth presses the corresponding punch upward, which owing to the springs immediately afterward falls down again. According to the transmission employed for the electric contact within the log the ratchet-wheel $e$ is rocked one tooth farther after the ship has run a certain number of miles, and consequently the punch $d^2$ has punched a hole in the tape of paper A, suitably guided and moved at a uniform rate of speed. When now the teeth of the second disk $e^3$ only are the fifth part of the teeth of the disk $e^2$, the punch $f^3$ punches a hole beside each fifth hole punched from the punch $f^2$, thus the reading of the number of holes punched by $f^2$ being rendered very easy.

The tape of paper A, being wound upon a roller B by suitable means—for instance, by a clockwork—at a uniform rate of speed, is slowly wound upon the roller C. This winding of the tape is easily attained by slowly rotating the roller C, this roller being advantageously rotated by the clockwork. Evidently other suitable mechanisms might be provided to effect the rotation of the roller.

A pinion D, provided with sixty teeth, corresponding to the minutes, effects the time recording. This pinion is rotated by a clockwork arranged within the casing F and so mounted that the teeth press against the tape of paper A, thereby punching holes in this tape in uniform distances. In order to allow an easy reading, each fifteenth tooth, corresponding to a quarter of an hour, is omitted, (see Fig. 3,) so that at the quarters of hours no hole is punched into the tape, while the full hours are indicated by a tooth $g$, arranged laterally to each fourth hole. This minute-wheel also may be employed for moving the tape A, so that an especial clockwork is rendered superfluous.

For registering the position of the rudder I employ a roller $h$, composed of several compartments, Fig. 2. Each of these compartments is provided with a recess $i$ in the manner illustrated in Fig. 1 of the drawings. The roller $h$ is rigidly connected to the shaft $k$, carrying on the outside of the apparatus a chain-wheel $f$. (Shown diagrammatically in Figs. 1 and 2 of the drawings.) The shaft of the rudder carries a chain-wheel of a diameter similar to the diameter of $f$, and both wheels are connected by a chain running over them. In consequence thereof the shaft $k$ effects the same movements as the shaft of the rudder. According to the position of the roller $h$ one of the levers $l$ with its lower extremity engages with the corresponding recess $i$, whereby the pawl $m$, fixed to the free extremity, is moved one tooth of the ratchet-wheel backward. When now the rudder further is rotated, the pawl $l$ again is lifted out of the recess, thereby the ratchet-wheel $e$ being moved one tooth farther.

In the accompanying drawings the roller $h$ is composed of eleven compartments, having eleven recesses $i^4$ to $i^{14}$, out of line with one another. Eleven levers $l^4$ to $l^{14}$ correspond to the aforesaid recesses and influence the ratchet-wheels $e^4$ to $e^{14}$, loosely mounted upon the shaft carrying the toothed disks $e^2$ and $e^3$. The ratchet-wheels $e^4$ to $e^{14}$ actuate punches $f^4$ to $f^{14}$, arranged vertically above them in the manner similar to the aforedescribed disks $e^2$ and $e^3$.

For registering the number of revolutions of the engine I employ a cam $n$, recording the revolutions in the same manner as the speed is recorded. This cam $n$ by means of an electromagnetic gearing, the current of which is closed at predetermined intervals by means of contacts fixed to the screw-shaft, is rotated and acts upon the ratchet-wheel $e'$ by means of a crank-lever $o$ and a pawl $p$. The ratchet-wheel acts upon a punch $f'$, which in the before-explained manner punches a hole into tape.

By means of the apparatus clearly described in the foregoing description it is possible to record the speed, the time, and the position of the rudder, and from the tape it can easily be seen in what manner and to which degree the position of the rudder and the revolutions of the engine-shaft influence the movements of the vessel, Fig. 3.

Having thus fully described the nature of my invention, what I desire to secure by Letters Patent of the United States is—

In a speed-register and time-recorder for ships, the combination with a shaft $a$ rotated by the ship's log and carrying a cam $b$, a crank-lever $c$ having a pawl $d$, a ratchet-wheel $e$ composed of two toothed disks $e^2\ e^3$ with a different number of teeth, punches $f^2\ f^3$ actuated by the disks $e^2\ e^3$ and punching holes into a tape at each rocking of the disks, the same being effected by the cam $b$ and transmitted to the disks $e^2\ e^3$ by the crank-lever $c$, and pawl $d$, a tape A suitably guided above the punchers, a minute-wheel D rotated at a uniform rate of speed recording the quarters and full hours upon the tape, a roller $h$ composed of several compartments, all of them being provided with recesses $i$ out of line with one another, a shaft $k$ carrying the roller $h$, means to connect said shaft to the shaft of the rudder of the vessel, levers $l^4$ to $l^{14}$ alternatively engaging into the recesses of the different compartment of $h$ and actuating corresponding ratchet-wheels, ratchet-wheels $e^4$ to $e^{14}$ located vertically above the levers $l^4$ to $l^{14}$, punches $f^4$ to $f^{14}$ actuated by the ratchet-wheels $l^4$ to $l^{14}$ and punching holes into the tape A, thereby recording the movements of the shaft $k$ and consequently of the rudder, a cam $n$ rotated by an electromagnetic gear connected to the screw-shaft of the engine and working similarly to the gear usually employed for speed-recording, a crank-lever $o$ having a pawl $p$ both being rocked by the cam $n$, a punch $f'$ actuated by the pawl $p$ and recording the movements of the cam $n$, and consequently the revolutions of the screw-shaft, the whole substantially as described.

In witness whereof I have hereunto set my hand in presence of two witnesses.

ADOLF BOPP.

Witnesses:
HENRY HASPER,
WOLDEMAR HAUPT.